United States Patent [19]
Ekander et al.

[11] Patent Number: 4,939,754
[45] Date of Patent: Jul. 3, 1990

[54] DEVICE FOR LIMITATION OF A FLOW THROUGH A DENSITY LOCK FOR A NUCLEAR REACTOR

[75] Inventors: Hans Ekander; Rikard Gebart, both of Västerås, Sweden

[73] Assignee: ABB Atom AB, Sweden

[21] Appl. No.: 251,885

[22] Filed: Sep. 30, 1988

[30] Foreign Application Priority Data

Oct. 6, 1987 [SE] Sweden ................................ 8703849

[51] Int. Cl.$^5$ .............................................. G21C 9/02
[52] U.S. Cl. ...................................... 376/282; 376/328
[58] Field of Search ............... 376/282, 328, 366, 403, 376/404, 406; 137/247.11, 247.35; 4/192

[56] References Cited

U.S. PATENT DOCUMENTS

| | | | |
|---|---|---|---|
| 4,352,778 | 10/1982 | Arnaud et al. | 376/365 |
| 4,363,780 | 12/1982 | Hannerz | 376/282 |
| 4,526,742 | 7/1985 | Hannerz | 376/282 |
| 4,666,654 | 5/1987 | Forsberg | 376/282 |
| 4,783,306 | 11/1988 | Vecsey et al. | 376/282 |
| 4,859,406 | 8/1989 | Hannerz | 376/328 |

OTHER PUBLICATIONS

"Pressurized Water Reactor Inherent Core Protection by Primary System Thermohydraulics", Babala et al., Nuclear Science and Engr., 3/85, pp. 400–410.

Primary Examiner—Daniel Wasil
Attorney, Agent, or Firm—Watson, Cole, Grindle & Watson

[57] ABSTRACT

In a nuclear reactor of the safety type, density locks constitute an important safety function. Two liquid systems can be kept apart by means of density locks. During normal operating conditions, the density locks prevent the warmer water from a primary cooling system from being mixed with the colder water from a secondary cooling system. At an increased temperature level, the density locks permit water to flow through so that the warmer water is mixed with the colder water to reduce the increased temperature level. To prevent an undesired transport through the density locks, for example boric acid leaking in from the secondary cooling system during normal operating conditions, the density locks are provided with a honeycomb consisting of tube pieces assembled in parallel. The honeycomb tube must be much longer than four times the tube diameter. To prevent the occurrence of a resonant interaction between internal waves in the honeycomb tube, the Brunt-Väisälä frequency $$N = \sqrt{\frac{d\rho}{dz} \frac{g}{\rho_0}}$$

must vary through the tubes. This can be achieved by varying the tube area (8,9), by providing the tubes (10) with a partition (11) along half their lengths, or by arranging a relatively small radial thermal flux.

3 Claims, 2 Drawing Sheets

DEVICE FOR LIMITATION OF A FLOW THROUGH A DENSITY LOCK FOR A NUCLEAR REACTOR

TECHNICAL FIELD

The present invention relates to a device for limitation of a flow through an upper or a lower density lock for a nuclear reactor of safety type.

BACKGROUND ART

In nuclear reactors of safety type, constructed in accordance with the Secure concept with an upper and a lower density lock, the density locks constitute an important safety function. With a density lock, two liquid systems can be separated from each other at a boundary by a warmer liquid system being superimposed on a colder liquid system. During normal operating conditions, the density locks prevent the warmer water from a primary cooling system from being mixed with the colder water from a secondary cooling system (pool water). At an increased temperature level, the density locks permit water to flow through, among other things for mixing the warmer water with the colder water to reduce the increased temperature level.

DISCLOSURE OF THE INVENTION

To be able to reduce the turbulent mixing in density locks for a nuclear reactor during normal operating conditions, a honeycomb is inserted consisting of tube systems assembled in parallel at the boundary. The honeycomb tubes must be longer than four times the tube diameter to reduce the influence of turbulence.

A tube length of 20 times the tube diameter is sufficient to give a very considerable reduction of the flow through the density locks.

To avoid a resonant interaction between internal waves in the tubes, the so-called Brunt-Väisälä frequency N=

$$N = \sqrt{\frac{d\rho}{dz} \cdot \frac{g}{\rho_0}}$$

must vary through the tubes. This can be achieved by using a varying tube area, by providing the tubes with a partition along half of their length or by arranging a relatively small radial thermal flux.

In the case of great horizontal temperature gradients, a closed convection coil may be formed between the primary and secondary sides, which may contribute to increase the flow through the density lock. In, for example, a nuclear reactor of Secure type, temperature gradients are likely to arise since the density lock is defined in one direction by a warm wall and in the other direction by a cold wall. To avoid the horizontal temperature gradients in the density lock, the bundle of honeycomb tubes are formed with a surrounding gap towards the wall. The gap width should be at least a few decimetres. Further, the honeycomb must not be too tight but should allow flow with a low pressure drop between the tubes. Also, at the upper or lower side of the density lock, the space between the tubes should be blocked by means of a tight wall. The natural convection along the walls will homogenize the temperature field in the horizontal direction and give a linear variation of the temperature in the vertical direction. The underside of the density lock should further be protected from flow, which may lead to horizontal pressure gradients.

DESCRIPTION OF THE PREFERRED EMBODIMENT

Figure 1:
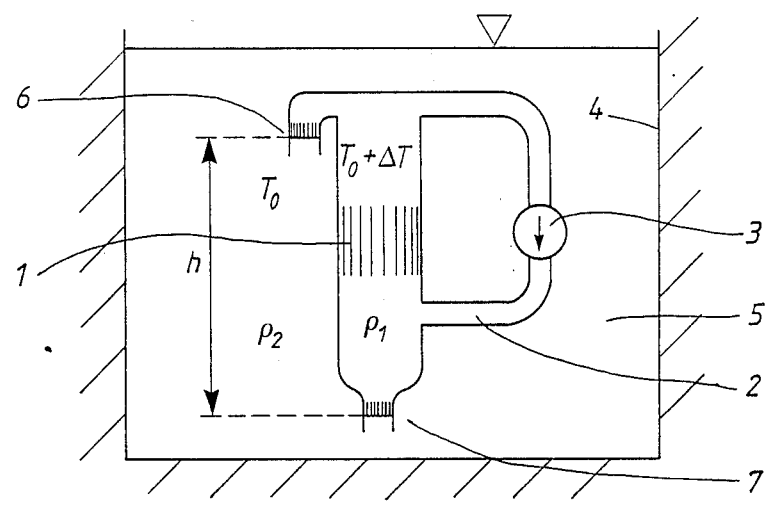
FIG. 1 shows a simplified view of a nuclear reactor of safety type having upper and lower density locks.

FIG. 1 shows a simplified sketch of the structure of a nucleare reactor of safety type having density locks. In the nuclear reactor a reactor core 1 is cooled by water from a primary cooling system 2. A pump 3 in the primary cooling system 2 is adapted to pump the water round in the system. The reactor core 1 with the primary cooling system 2 and the pump 3 are located in a pool 4 filled with water, the pool 4 being designed, in itself, to constitute a secondary cooling system 5. In the nuclear reactor the primary cooling system 2 and the secondary cooling system 5 are arranged so as to meet at an upper and a lower boundary 6, 7. The warmer water from the primary cooling system 2 will be superimposed, at the boundary, on the colder water from the secondary cooling system 5. This superimposition and separation of the liquid systems at the boundaries will function as a density lock for the liquid systems. The density in the primary cooling system 2 is designated $\rho_1$ and in the secondary cooling system 5 $\rho_2$. The level difference between the upper boundary 6 and the lower boundary 7 is designated h. The pressure difference between the upper boundary 6 and the lower boundary 7 in the two cooling systems can be expressed as $\Delta p_1 = \rho_1 g h + \Delta p_{pump}$ for the primary cooling system 2 and as $\Delta p_2 = \rho_2 g h$ for the secondary cooling system 5. The boundaries may be stationary if the pressure differences according to the above are equal and balance each other. Since the density is not the same in the two systems, a condition for achieving equilibrium is that the pump speed is chosen such that the pressure drop caused by pumping precisely compensates for the difference in the hydrostatic pressure drop. If a fault should possibly arise in the nuclear reactor, involving an increased temperature level, a flow will arise from the secondary cooling system 5 into the primary cooling system 2. The pool water in the secondary cooling system 5 is cold, which provides cooling, and, moreover, the water contains boric acid, which by neutron absorption makes the core 1 subcritical. The density locks with their simple design are a condition for a safe functioning of a nuclear reactor designed, for example, in accordance with the Secure concept. At the same time, the density locks are a potential source of problems, since boric acid which leaks in may disturb the operation during normal operating conditions.

Boric acid and heat can be transported through the density locks during normal operating conditions in accordance with the following principles: molecular diffusion, laminar or turbulent convective transport, and transport caused by non-linear phenomena of internal waves, for example the diffraction of internal waves.

The molecular diffusion is normally very slow except in the case of high diffusiveness. Molecular diffusion only can be neglected in this connection. The convective transport takes place in the laminar case in a thin boundary layer near fixed walls. In the turbulent case, turbulent eddies function as an increased diffusiveness in the liquid. Transport caused by internal waves may be treated on an equality with the turbulent transport. However, internal waves may provide a powerful mixing at much lower external disturbance levels than a "pure" turbulence. In addition, the internal waves have the property of being able to transport energy over long distances in density gradients without any significant dissipation. Visualization of mixing of an unprotected density gradient shows that the transport is performed in two steps: waves at the boundary are diffracted and make the boundary more diffuse, and the diffuse part is swept away by the turbulence.

With knowledge of these transport processes, it is only natural to try to protect the boundary in some way. This can be done by positioning a honeycomb, consisting of bundles of tube lengths assembled in parallel, at the boundary. The honeycomb will then allow flow in a vertical direction and thus does not disturb the function. However, the movement of the liquid in the lateral direction is limited, thus preventing wave diffraction. Simple tests have shown that the transport through the density locks decreases about $10^3$ times after the introduction of a honeycomb.

Figure 2:
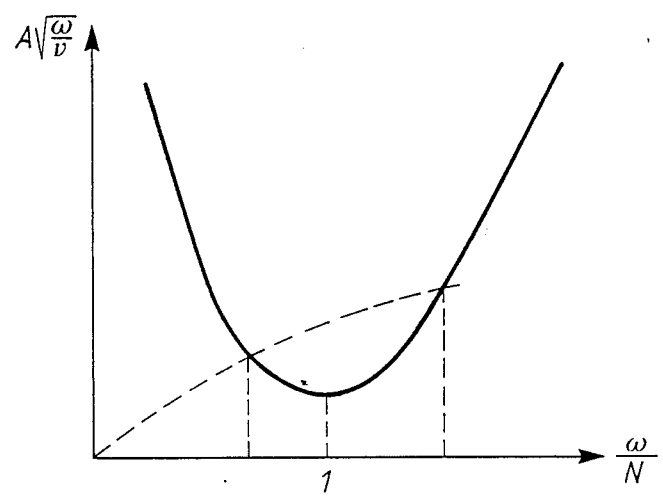
FIG. 2 shows a stability curve for oscillations in honeycomb tubes.

The introduction of a honeycomb does not remove any turbulence in the flow but reduces the influence of the turbulence on the boundary. The turbulence outside the honeycomb penetrates a certain distance into the tube ends, but since the scale of lengths of the eddies is limited, the eddies will fade away even after about two tube diameters The random, turbulent eddies will excite an axial oscillation. If the amplitude of this oscillation is suffuciently low, all transport will be carried out by a combination of convection and diffusion. The oscillation leads to an increased diffusion at the boundary layers, but at all normal frequencies the transport will be lower than 100 times the molecular transport without oscillation. At higher amplitudes, instabilities at the boundary layers will arise, which lead to mixing A closer study of the stability shows that also the frequency is of importance. See FIG. 2 which shows a stability curve for oscillations in honeycomb tubes. A designates amplitude, $\omega$ designates frequency and $\nu$ designates kinematic viscosity.

The region above the curve is unstable. At a given amplitude, the flow is unstable in a band around $\omega = N$, where $$N = \sqrt{\frac{\Delta \rho \, g}{\rho_0 L}}$$

$\Delta \rho$ = density difference between tube ends
$g = 9.81$ m/s$^2$
$\rho_0$ = mean density
$L$ = tube length minus 4·$d_{tube}$ If the flow is unstable, the transport may increase up to $10^3$ times, i.e. to the same value as without a honeycomb The instability may be compared to resonance since the natural frequency for oscillations in density gradients is given by N and the greatest instability arises at $\omega = N$.

If it can be ensured in some way that N varies in the tube, the transport will decrease, provided that the action does not introduce great disturbances. The transport would then decrease since it is not possible to have resonance in the entire tube at the same time. That part of the tube which is not in resonance would then lie as a "diffusive lid" on the part being in resonance. The total transport through the tube would, in the steady state, be determined by the part having the lowest transport.

Figure 3:
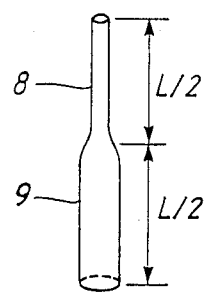
FIG. 3 shows an embodiment of a tube piece for a honeycomb tube assembly.

The area can be varied to obtain a varying N, for example by joining together two tubes 8, 9 having different areas, see FIG. 3. Since the transport is continuous, the gradient has to vary through the tube, so that where the area is small the gradient is steep and vice versa In the small tube 8, N is greater and consequently this tube will be more stable for low frequencies than the large tube 9. The transition between the tubes is made smooth, so that the flow is not diverted Simple experiments with a variable tube area show that a 50% difference in area results in a reduction of the transport of about 3-4 times.

Figure 4:
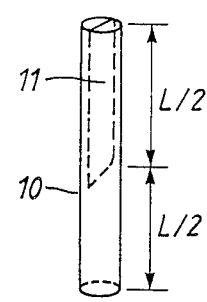
FIG. 4 shows an alternative embodiment of a tube piece for a honeycomb tube assembly.

Alternatively, a tube 10 may be provided along half its length with a thin partition 11 arranged in the middle of the tube 10 to achieve a varying N, see FIG. 4. The increase in wall area in the part with the partition 11 will give an increased transport in the boundary Consequently, the gradient need not be as steep as in the part without a partition. The transport will be equally great in both parts despite the fact that the gradient is not constant In this case, the part without a partition will be more stable at low frequencies. Visualization further shows that resonance is not attained in the whole tube simultaneously.

By providing the density locks with a honeycomb, where the tube length is much larger than four tube diameters, turbulence is not able to penetrate the density lock. To avoid a resonant interaction between internal waves, the so-called Brunt-Väisälä frequency $$N = \sqrt{\frac{d\rho}{dz} \cdot \frac{g}{\rho_0}}$$

must vary through the tubes.

This can be achieved by varying the area of the tubes or providing them with a partition along half their length, or by arranging a relatively small radial thermal flux. If a variable area is chosen, the area difference should be at least 50%. In this case, a tube length corresponding to 20 times the tube diameter is sufficient to provide a very considerable reduction of the flow through the density locks.

Figure 5:
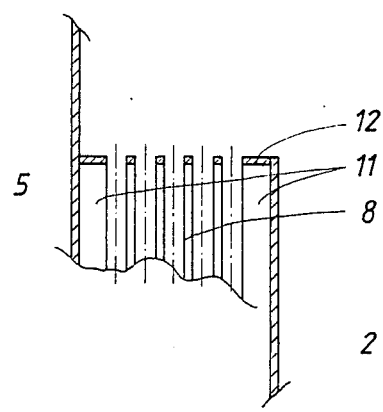
FIG. 5 shows an upper part of a honeycomb tube assembly showing blocking means and gaps.

The density lock in, for example, a nuclear reactor of Secure type gives a small flow in normal operation, for as long as the horizontal temperature gradients are avoided. In case of great horizontal temperature gradients, there is a possibility of a closed convection coil between the primary and secondary sides, which may increase the flow several times. In Secure type nuclear reactors there are risks of horizontal temperature gradients, since the density lock is limited in one direction by a hot wall and in the other direction by a cold wall. With an accurately chosen construction, natural processes can eliminate the horizontal temperature gradients. Insulation of the density lock is in this case impossible, unless a thermos principle or the like is used, which is an expensive and unreliable method. By arranging a gap 11 (FIG. 5) around the bundle of tubes along the walls towards the pool and the primary system with a width of one or a few decimetres, a natural convection will arise, a flow upwards along the hot wall and donwards along the cold wall. Outside of the existing boundary a secondary flow will be formed. This flow will compensate the horizontal gradients since thermal conduction is a slow process compared with convection. In the steady state a largely linear temperature variation in the vertical direction and a constant temperature level in the horizontal direction will be obtained, except in two thin boundary layers in the cold and the hot walls. To obtain a low resistance in the horizontal direction between the tubes, the tubes in the tube bundle are sparsely arranged. At the upper or lower ends of the tubes, the space between the tubes may be blocked 12, for example by attaching the tubes in a plate with appropriate holes.

Further, to be able to protect the density lock against the convective boundary layer on the outside of a riser to the reactor, the density lock is provided with a spoiler or a blocking means. The spoiler deflects the flow to such an extent that the whole density lock gets into the wake from the spoiler. If the velocities in the wake are sufficiently low, the pressure variations will be acceptable. The blocking means is arranged so that part of the space between the tubes is also blocked on the underside. The unblocked surface should be so small that no significant pressure variation arises.

We claim:

1. A device for limiting flow through an upper or lower density lock of a nuclear reactor comprising a reactor core cooled by a primary cooling system in communication with a secondary cooling system at the upper and lower density locks, the device comprising:
    a honeycomb structure comprising a bundle of tube pieces arranged in parallel, each tube piece comprising two tube parts of equal length and unequal area.

2. The device according to claim 1, wherein there is a difference of at least 50% between the unequal areas of the tube parts.

3. The device according to claim 1, further comprising a thin partition extending within each tube piece along half the length of each tube piece.

* * * * *